(12) United States Patent
Jang et al.

(10) Patent No.: US 9,081,228 B2
(45) Date of Patent: Jul. 14, 2015

(54) LIQUID CRYSTAL DISPLAY APPARATUS HAVING SCATTERING PARTICLE OPTICAL SHEET

(71) Applicant: SAMSUNG ELECTRONICS CO., LTD., Suwon-si (KR)

(72) Inventors: Nae-won Jang, Seongnam-si (KR); Sang-eun Lee, Seoul (KR); Young-chol Lee, Hwaseong-si (KR); Byoung-jin Cho, Anyang-si (KR); Hyeong-sik Choi, Hwaseong-si (KR); Ju-seong Hwang, Asan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 13/845,969

(22) Filed: Mar. 18, 2013

(65) Prior Publication Data
US 2013/0329164 A1    Dec. 12, 2013

(30) Foreign Application Priority Data
Jun. 8, 2012    (KR) .................. 10-2012-0061593

(51) Int. Cl.
*G02F 1/1335*    (2006.01)
(52) U.S. Cl.
CPC ........ *G02F 1/133606* (2013.01); *G02F 1/1335* (2013.01); *G02F 1/133504* (2013.01); *G02F 2001/133567* (2013.01)
(58) Field of Classification Search
CPC .................. G02F 1/133606; G02F 1/133604; G02F 1/133615; G02F 1/133526; G02F 2001/133607; G02B 6/0068; G02B 6/0038; G02B 6/0053
USPC ................................. 349/64, 65, 57
See application file for complete search history.

(56) References Cited

U.S. PATENT DOCUMENTS

| | | | |
|---|---|---|---|
| 6,433,846 B1 * | 8/2002 | Omar et al. ................... | 349/112 |
| 7,322,731 B2 * | 1/2008 | Epstein et al. ................ | 362/609 |
| 7,614,775 B2 * | 11/2009 | Iwasaki ........................ | 362/616 |
| 7,782,421 B2 * | 8/2010 | Bang et al. ...................... | 349/65 |
| 8,013,962 B2 * | 9/2011 | Nishino et al. ................ | 349/114 |
| 8,023,065 B2 * | 9/2011 | Epstein et al. .................. | 349/62 |
| 8,208,100 B2 * | 6/2012 | Satake et al. .................. | 349/112 |
| 2006/0291185 A1 * | 12/2006 | Atsushi ........................... | 362/29 |
| 2008/0055523 A1 | 3/2008 | Nishihara et al. | |

FOREIGN PATENT DOCUMENTS

| | | |
|---|---|---|
| EP | 2 124 095 A1 | 11/2009 |
| WO | 01/22130 A1 | 3/2001 |

OTHER PUBLICATIONS

Communication from the European Patent Office issued Sep. 17, 2013 in counterpart European Application No. 13157756.1.

* cited by examiner

*Primary Examiner* — Mike Qi
(74) *Attorney, Agent, or Firm* — Sughrue Mion, PLLC

(57) ABSTRACT

A liquid crystal display apparatus according to an exemplary embodiment of the present inventive concept is provided the liquid crystal display apparatus includes a liquid crystal panel which displays images; backlight unit which provides light to the liquid crystal panel; and an optical sheet unit which is placed between the liquid crystal panel and backlight, wherein the optical sheet unit includes at least one scattering particle optical sheet where scattering particles are provided.

23 Claims, 12 Drawing Sheets

LIQUID CRYSTAL DISPLAY APPARATUS HAVING SCATTERING PARTICLE OPTICAL SHEET

CROSS-REFERENCE TO RELATED APPLICATIONS

This application claims priority from Korean Patent Application No. 10-2012-0061593, filed in the Korean Intellectual Property Office on Jun. 8, 2012, the disclosure of which is incorporated herein by reference, in its entirety.

BACKGROUND

1. Field

Methods and apparatuses consistent with the exemplary embodiments relate to a liquid crystal display apparatus, and more particularly to a liquid crystal display apparatus which has at least one scattering particle optical sheet between a liquid panel and a backlight.

2. Description of the Prior Art

A liquid crystal display apparatus generally includes a liquid crystal panel which displays images, a backlight which provides light to the liquid crystal panel, and a plurality of optical sheets between the liquid panel and the backlight.

These optical sheets play a role of increasing the uniformity of brightness of light entering the liquid panel, and screening unintended images such as LED mura images and images of the light guide plate so that they are not displayed by the liquid crystal panel.

Specifications of these optical sheets vary according to the types of liquid crystal display apparatuses and their manufacturers. However, it is common for numerous optical sheets to generally be applied in order to guarantee the required optical performance.

It is obvious that the larger the number of optical sheets, the higher the manufacturing costs of the liquid crystal display apparatus. Therefore, there is a need for a measure to guarantee the appropriate performances but also to reduce the number of the optical sheets, at the same time.

SUMMARY

An aspect of the exemplary embodiments relates to a liquid crystal display apparatus having an optical sheet unit which presents an equivalent optical function as compared to a conventional liquid crystal display apparatus, while also reducing the number of optical sheet units.

According to an exemplary embodiment of the present inventive concept, a liquid crystal display apparatus may include a liquid crystal panel which displays images; a backlight which provides light to the liquid crystal panel; and an optical sheet unit placed between the liquid crystal panel and backlight; and the optical sheet unit may include at least one scattering particle optical sheet where scattering particles are provided.

The scattering particle optical sheet may include an optical functional layer; and a base layer which supports the optical functional layer, and the scattering particles may be provided in at least one of the optical functional layer and the base layer.

The scattering particles may be provided in the optical functional layer.

The scattering particles may be provided in an external surface or inside of the optical functional layer.

The scattering particles may be provided in an external surface and inside of the optical functional layer.

The scattering particles may be provided in the base layer.

The scattering particles may be provided in an external surface or inside of the base layer.

The scattering particles may be provided in an external surface and inside of the base layer.

The scattering particle optical sheet may be one of a diffuser sheet, a prism sheet, a microlens sheet, and a protection sheet.

The scattering particle optical sheet may include a first optical sheet; and a second optical sheet bonded to the first optical sheet, the first optical sheet may include a first functional layer; and a first base layer which supports the first optical functional layer, and the second optical sheet may include a second optical functional layer; and a second base layer which supports the second optical functional layer.

The scattering particles may be provided in at least one of the first optical functional layer, the first base layer, the second optical functional layer, and the second base layer.

The first optical sheet and second optical sheet may be different kinds of optical sheets.

The scattering particle may be formed by one of acryl, nylon, Barium sulfate (BaSO4), Aluminum (Al), and silver (Ag).

The optical sheet unit may be a unique optical sheet and may include the scattering particle optical sheet.

The scattering particle optical sheet may be attached to a back surface of the liquid crystal panel.

The exemplary embodiments further include a liquid crystal display apparatus having: an optical sheet unit placed between a liquid crystal panel and a backlight; the optical sheet unit includes at least one scattering particle optical sheet where scattering particles are provided.

The scattering particle optical sheet includes: an optical functional layer; and a base layer which supports the optical functional layer, wherein the scattering particles are provided in at least one of the optical functional layer and the base layer.

A liquid crystal display apparatus may further include: an optical sheet unit including at least one scattering particle optical sheet where scattering particles are provided. The optical sheet unit may be placed between a liquid crystal panel and a backlight. The scattering particle optical sheet may include: an optical functional layer; and a base layer which supports the optical functional layer, wherein the scattering particles are provided in at least one of the optical functional layer and the base layer.

BRIEF DESCRIPTION OF THE DRAWINGS

The above and/or other aspects of the present inventive concept will be more apparent by describing certain aspects of the present inventive concept with reference to the accompanying drawings, in which.

DETAILED DESCRIPTION

Figure 1:
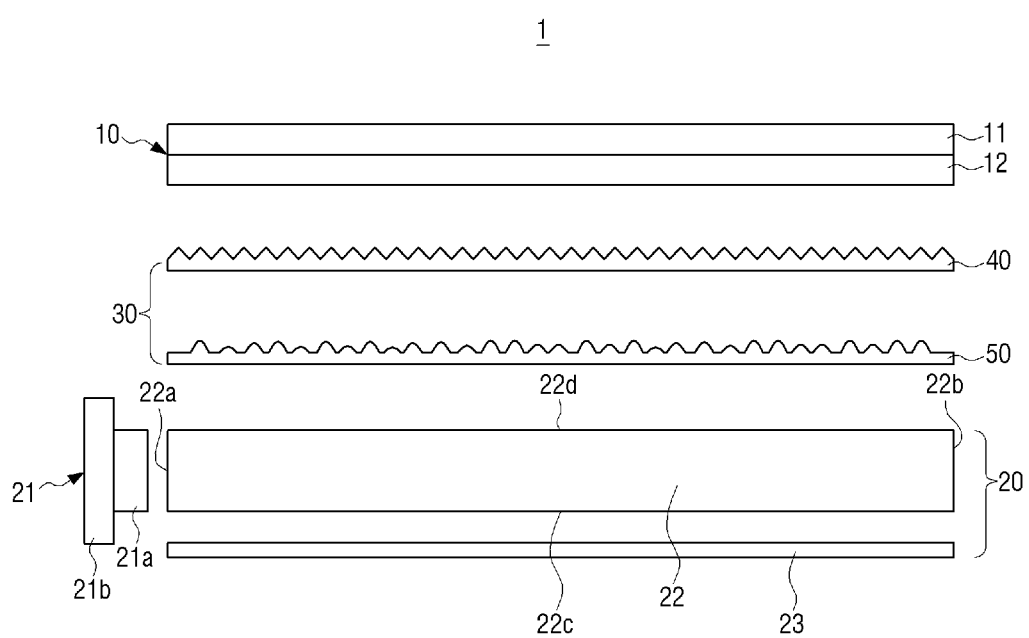
FIG. 1 is a diagram illustrating a liquid crystal display apparatus according to an exemplary embodiment of the present inventive concept.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, the exemplary embodiments can be practiced without those specifically defined matters. Also, well-known functions or constructions are not described in detail since they would obscure the application with unnecessary detail.

FIG. 1 is a diagram illustrating a liquid crystal display apparatus according to a first exemplary embodiment of the present inventive concept.

Referring to FIG. 1, the liquid crystal display apparatus 1 according to a first exemplary embodiment of the present inventive concept includes a liquid crystal panel 10, a backlight 20, and an optical sheet unit 30.

In practice, it is common for these components 10, 20, 30 to be packaged in one module by a front and back chassis (not illustrated). However, the front and back chassis are omitted in FIG. 1 for convenience of explanation and illustration. In the same regard, other components of the liquid crystal display apparatus 1 that are not directly related to the present inventive concept are also omitted.

The liquid crystal panel 10 is a component which displays images. It includes an upper board 11 and a lower board 12, and has a liquid crystal layer (not illustrated) between the upper board 11 and lower board 12. A color filter layer (not illustrated) is formed in the upper board 11, and a TFT array (Thin Film Transistor array) (not illustrated) which includes a plurality of transistors is formed in the lower board 12.

An image may be displayed from the liquid crystal panel 10 as the liquid crystal layer is driven according to switching operations of the TFT array. The configuration and the operation principle of the liquid crystal panel 10 are already well known, and thus detailed explanation is omitted.

The backlight 20 is for providing light necessary for displaying images on the liquid crystal panel 10. The backlight 20 includes a light source 21, a light guide plate 22, and reflection sheet 23.

The light source 21 is placed on a side of the light guide plate 22 and provides light inside the light guide plate 22. Accordingly, the light source 21 includes at least one light source 21a and a light source supporting board 21b which supports the light source 21a. The light source supporting board 21b plays the role of supporting the light source 21a and delivering power to the light source 21a.

For example, the light source 21a may be a light emitting diode (LED). In FIG. 1, one light source unit 21 is placed to face an edge 22a of the light guide plate 22, but this is just an exemplary embodiment, and thus one or more additional light source units may be placed to face other edge of the light guide plate 22. For example, there may be provided additional light source units which face another edge 22b of the light guide plate 22 may be provided. A backlight method where light source units are placed on sides of a liquid crystal panel as in the backlight 20 illustrated in FIG. 1 is called an edge type backlight.

The light guide plate 22 plays a role of guiding light provided by the light source 21 towards the liquid crystal panel 10. Accordingly, light emitting patterns (not illustrated) are formed in the light guide plate 22. When light which entered the light guide plate 22 meets a light emitting pattern, the light is directed to the liquid crystal panel 10 as it is scattered. For example, light emitting patterns are formed in a back surface 22c of the light guide plate 22.

Meanwhile, if the liquid crystal display apparatus 1 is a type that may display three-dimensional images, besides light emitting patterns, lenticular patterns (not illustrated) may be additionally formed in the light guide plate 22. The lenticular patterns are for increasing 3D scanning efficiency. For example, they may be formed in a front surface 22d of the light guide plate 22.

Light emitting patterns and lenticular patterns are already well known. Therefore, an explanation thereof is omitted.

The reflection sheet 23 reflects a part of the light leaked from the light guide plate 22 back to the light guide plate 22, thereby increasing the light efficiency.

The optical sheet unit 30 is placed between the liquid crystal panel 10 and the backlight 20, and plays a role of increasing the uniformity of the brightness of light provided by the backlight 20, and plays a role in screening unintended images displayed by the liquid crystal panel 10. Herein, unintended images refer to various images that may appear by elements of the backlight such as an LED mura image, light emitting pattern image, lenticular pattern image, etc.

Accordingly, the optical sheet unit 30 includes a prism sheet 40 and a diffuser sheet 50. As already well known, the diffuser sheet 50 plays a role of screening the aforementioned unintended images by diffusing the light, and the prism sheet 40 contributes to increasing the brightness of the light and the uniformity of the brightness of the light by collimating the light.

Figure 2:
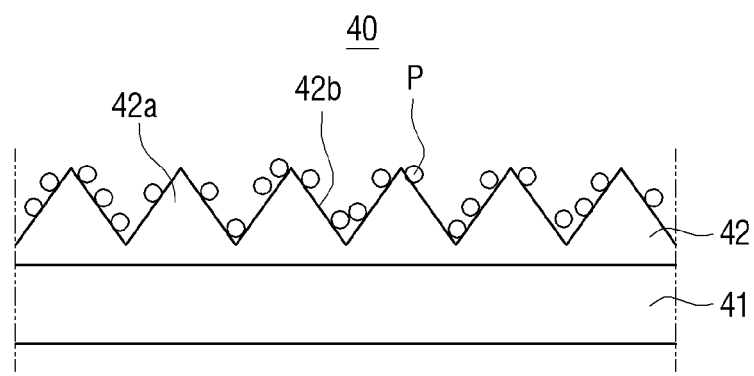
FIG. 2 is a diagram illustrating an enlarged view of a prism sheet provided in the liquid crystal display apparatus of FIG. 1.

FIG. 2 is a diagram illustrating an enlarged view of the prism sheet provided in the liquid crystal display apparatus of FIG. 1, and FIGS. 3 to 5 are diagrams illustrating alternative exemplary embodiments of the prism sheet of FIG. 2.

Referring to FIG. 2, the aforementioned prism sheet 40 includes a base layer 41 and optical functional layer 42.

The base layer 41 is for supporting the optical functional layer 42, and may be manufactured as one of Polyethylene terephthalate (PET), Polystyrene (PS), Polycarbonate (PC), and Polyehtersulfone (PES).

The optical functional layer 42 is a portion which actually plays the role of a light collimating function of the prism sheet 40. Accordingly, the optical functional layer 42 includes a plurality of prism structures 42a, each having a prism shape.

In such an optical functional layer 2, a plurality of scattering particles P are distributed. The scattering particles P enable the prism sheet 40 to have a screening ability by scattering the light. That is, as aforementioned, the visibility of the unintended images of the LED mura image, light emitting pattern image, and lenticular pattern image, etc. may be weakened by the prism sheet 40.

The scattering particles P may be selected from among materials such as, for example, Acryl, Nylon, Barium sulfate (BaSO4), Aluminum (Al), and silver (Ag) etc. Furthermore, the scattering particles P may be of several or tens of μm beads size, or of nano size smaller than that.

More specifically, the scattering particles P are distributed randomly on a surface 42b of the optical functional layer 42. In this case, the scattering particles P may be formed on the optical functional layer 42 by a spray coating process or depositing process. Unlike in FIG. 2, the scattering particles P may be distributed within the optical functional layer 42, in which case the scattering particles P may be provided within the optical functional layer 42 by being mixed with the main material when shaping the optical functional layer 42.

Figure 3:
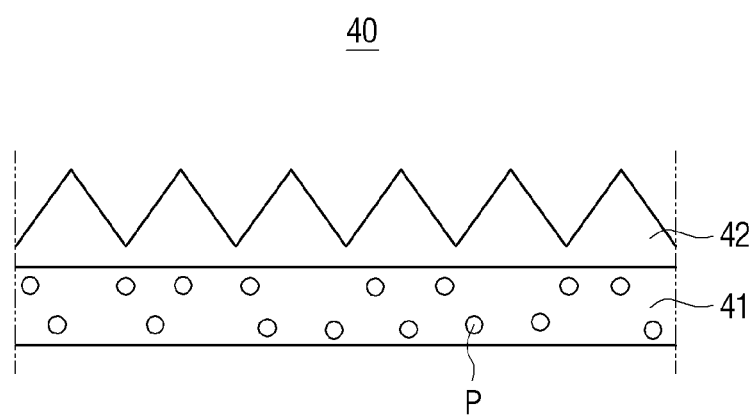
FIGS. 3 to 5 are diagrams illustrating alternative exemplary embodiments of the prism sheet of FIG. 2.

As illustrated in FIG. 3, the scattering particles P may be distributed randomly within the base layer 41. In such a case, the scattering particles P may be provided within the base layer 41 by being mixed with the main material when the base layer 41 is formed.

Figure 4:
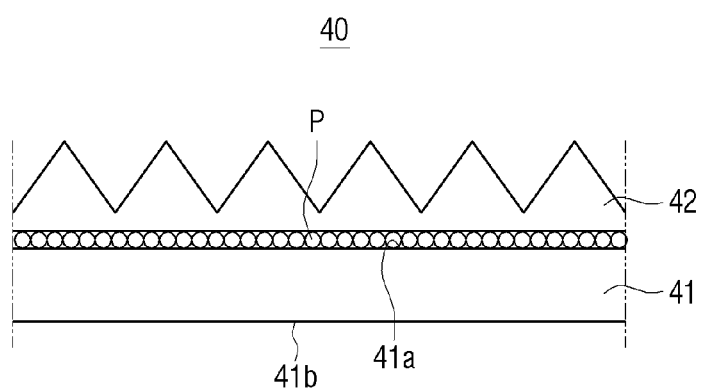

As illustrated in FIG. 4, the scattering particles P may be distributed randomly in a front surface 41A of the base layer 41. In such a case, the scattering particles P may be formed on the front surface 41a of the base layer 41 by a spray process or by a depositing process, after the base layer 41 is formed. In addition, as illustrated, the scattering particles P may be formed on a back surface 41b of the base layer 41.

Figure 5:
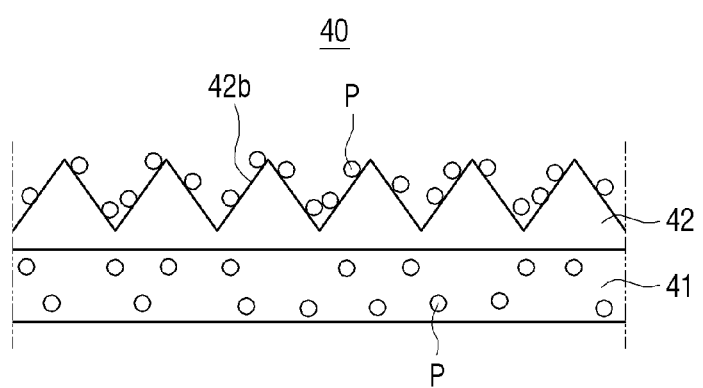

As illustrated in FIG. 5, the scattering particles P may be formed on both the base layer 41 and optical functional layer 42. For example, the scattering particles P may exist on the surface 42b of the optical functional layer 42 and may also exist inside the base layer 41.

Figure 6:
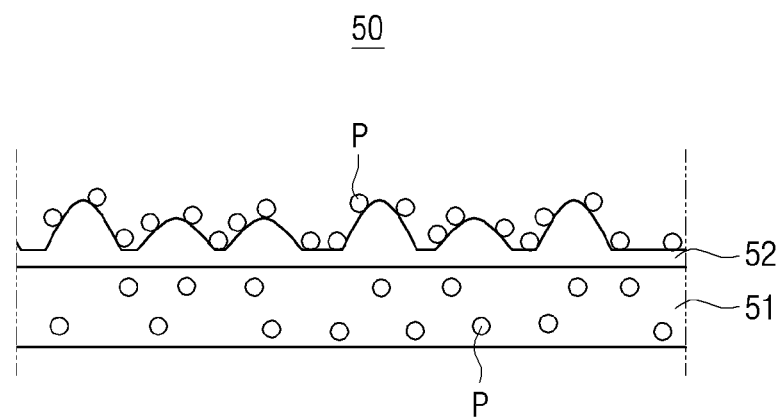
FIG. 6 is a diagram illustrating an enlarged view of a diffuser sheet provided in the liquid crystal display apparatus of FIG. 1.

FIG. 6 is a diagram illustrating an enlarged view of the diffuser sheet provided in the liquid crystal display apparatus of FIG. 1

Referring to FIG. 6, the aforementioned diffuser sheet 50 includes a base layer 51 and an optical functional layer 52 formed on the base layer 51.

The base layer 51 is for supporting the optical functional layer 52, and may be manufactured as one of for example, PET, PS, PC, and PES. Meanwhile, the functional layer 52 is a portion which actually performs the optical diffusing function of the diffuser sheet 50.

Scattering particles P are provided in the diffuser sheet 50 as well. For example, as illustrated in FIG. 6, scattering particles P are randomly distributed on the surface of the optical functional layer 52 and also inside the base layer 51. Alternatively, scattering particles P may be provided in only one of the optical functional layer 52 and base layer 51.

The scattering particles P increase the screening ability of the diffuser sheet 50 by scattering the light which entered the diffuser sheet 50. In other words, the diffuser sheet 50 has a screening ability for unintended images such as an LED mura image, light emitting pattern image, and lenticular pattern image, etc., and the screening ability is reinforced by the scattering particles P additionally distributed in the diffuser sheet 50.

As aforementioned, the optical sheet unit 30 of the liquid crystal display apparatus 1 includes two optical sheets having additional scattering particles; that is, the prism sheet 40 and diffuser sheet 50. In other words, the prism sheet 40 and diffuser sheet 50 are optical sheets where scattering particles P have been added to a common prism sheet and diffuser sheet. Hereinafter, these optical sheets where the scattering particles P have been additionally provided are referred to as 'scattering particle optical sheets' to distinguish them from common optical sheets.

As the optical sheet unit 30 consists of two scattered optical sheets 40, 50, it may have a greater screening ability than a common optical sheet unit which consists of two common optical sheets. Therefore, the optical sheet unit 30 may present an equivalent screening ability with a lesser number of optical sheets than a conventional optical sheet unit. In other words, the optical sheet unit 30 includes two optical sheets, that is, the prism sheet 40 and diffuser sheet 50, but may present at least an equivalent screening ability compared a conventional optical sheet unit which has at least three common optical sheets (for example, scattered prism sheet, diffuser sheet, and protection sheet) where scattered particles are not added.

Consequently, in a case of the liquid crystal display apparatus 1 according to an exemplary embodiment, as the optical sheet unit 30 consists of scattering particle optical sheets 40, 50, the screening ability can be increased over that of a conventional optical sheet unit. This means that it is possible to reduce the number of optical sheets which form the optical sheet unit 30 of the present exemplary embodiment. Accordingly, it is obvious that the manufacturing cost of the liquid crystal display apparatus 1 can be reduced.

Figure 7:
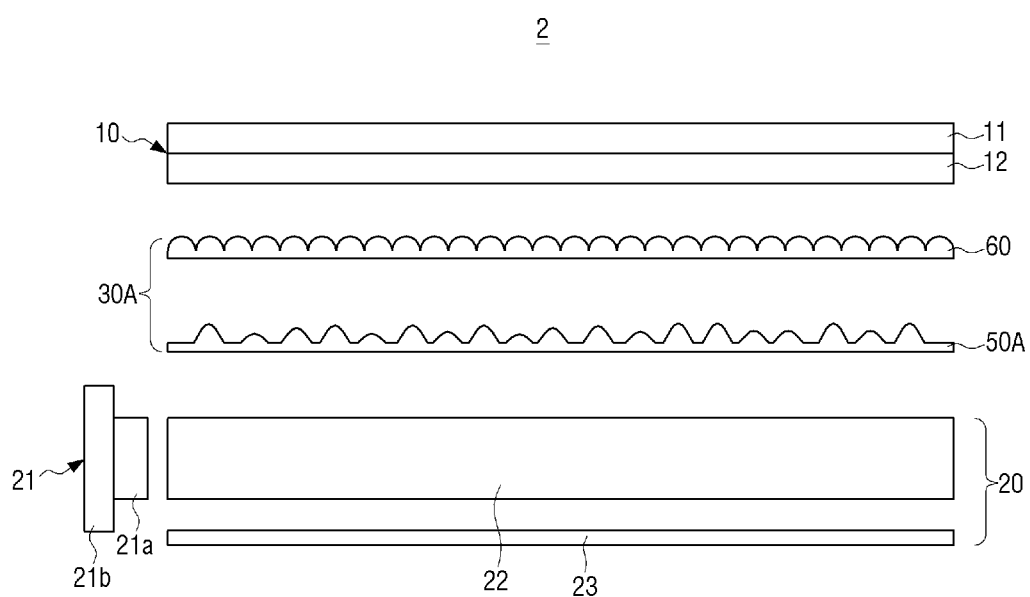
FIG. 7 is a diagram illustrating a liquid crystal display apparatus according to a second exemplary embodiment of the present inventive concept.
Figure 8:
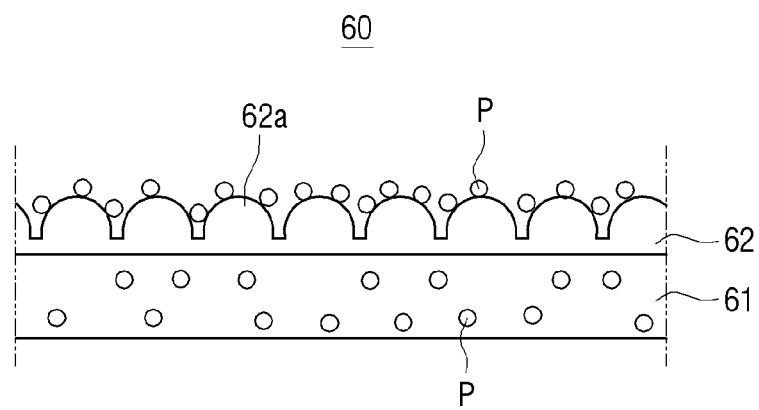
FIG. 8 is a diagram illustrating an enlarged view of a microlens sheet provided in the liquid crystal display apparatus of FIG. 7.
Figure 9:
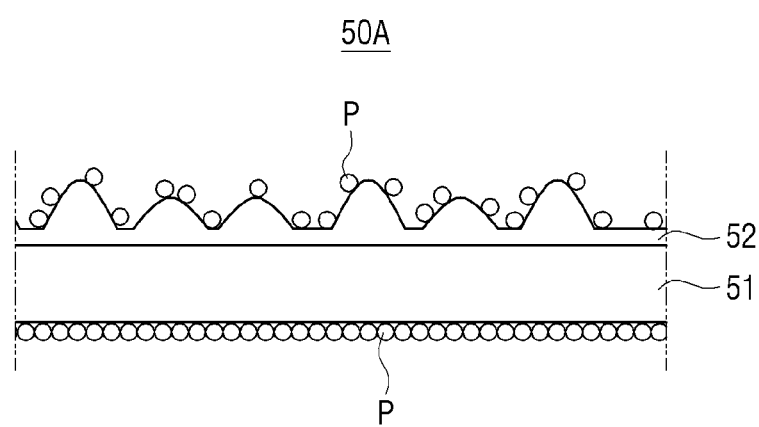
FIG. 9 is a diagram illustrating an enlarged view of a diffuser sheet provided in the liquid crystal display apparatus of FIG. 7.

FIG. 7 is a diagram illustrating a liquid crystal display apparatus according to a second exemplary embodiment of the present inventive concept, and FIG. 8 is a diagram illustrating an enlarged view of a microlens provided in the liquid crystal display apparatus of FIG. 7. FIG. 9 is a diagram illustrating an enlarged view of a diffuser sheet provided in the liquid crystal display apparatus of FIG. 7.

Referring to FIG. 7, the liquid crystal display apparatus 2 according to the second exemplary embodiment of the present inventive concept includes a liquid crystal panel 10, a backlight 20, and an optical sheet unit 30A.

The liquid crystal panel 10 and backlight unit 20 illustrated in FIG. 7 are the same as the liquid crystal panel 10 and backlight 20 illustrated in FIG. 1 aforementioned, and thus repeated explanation thereof is omitted.

The optical sheet unit 30A includes a microlens sheet 60 and a diffuser sheet 50A. These microlens sheet 60 and diffuser sheet 50A are scattering particle optical sheets as aforementioned.

Referring to FIG. 8, the microlens sheet 60 includes a base layer 61 and an optical functional layer 62 which includes a plurality of microlens 62a for collimating light.

In the microlens sheet 60, scattering particles P are additionally provided. Therefore, the microlens sheet 60 is a kind of scattering particle optical sheet. For example, as illustrated in FIG. 8, scattering particles P are randomly distributed in a surface of the optical functional layer 62 and inside the base layer 61. As such, the microlens sheet 60 is a scattering particle optical sheet where scattering particles have been added, and thus can have an increased screening ability compared to a common microlens sheet.

Referring to FIG. 9, the diffuser sheet 50A includes a base layer 51 and an optical functional layer 52.

Similarly with the aforementioned diffuser sheet 50A, scattering particles P are also additionally provided in the diffuser sheet 50A of FIG. 9. Therefore, the diffuser sheet 50A of FIG. 9 is also a kind of scattering particle optical sheet. For example, as illustrated in FIG. 9, scattering particles P may be additionally provided in a surface of the optical functional layer 52 and a lower surface of the base layer 51. Such scattering particles P may be formed by a spray coating process or may be formed by a depositing process. As such, the diffuser sheet 51 is a scattering particle optical sheet where scattering particles have been added, and thus can have a greater screening ability than a common microlens sheet.

As aforementioned, the optical sheet unit 30A of the a liquid crystal display apparatus 2 of a second exemplary embodiment consists of two scattering particle optical sheets 60, 50A, reinforcing the screening ability and providing a greater screening ability than a conventional optical sheet unit, thereby reducing the number of the optical sheets.

Figure 10:
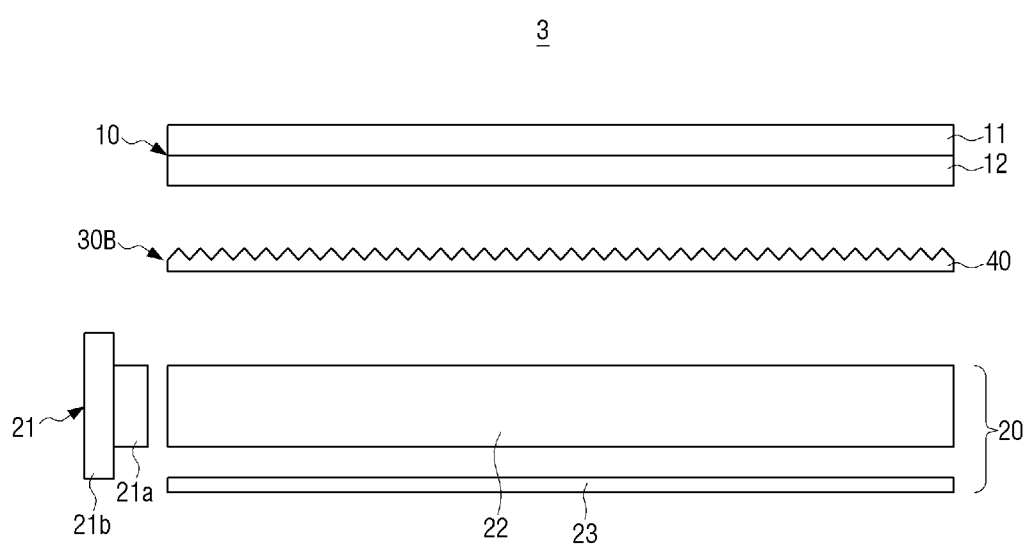
FIG. 10 is a diagram illustrating a liquid crystal display apparatus according to a third exemplary embodiment of the present inventive concept.

FIG. 10 is a diagram illustrating a liquid crystal display apparatus according to a third exemplary embodiment of the present inventive concept.

Referring to FIG. 10, the liquid crystal display apparatus 3 according to the third exemplary embodiment of the present inventive concept includes a liquid crystal panel 10, a backlight 20, and an optical sheet unit 30B.

The liquid crystal panel 10 and backlight 20 illustrated in FIG. 10 are the same as the liquid crystal panel 10 and backlight 20 illustrated in FIG. 1; and thus repeated explanation thereof is omitted.

The optical sheet unit 30B consists of only one scattering particle optical sheet 40. For example, the scattering particle optical sheet 40 may be one of the prism sheets 40 illustrated in the aforementioned FIGS. 2 to 4. As another example, the scattering particle optical sheet 40 may be a diffuser sheet where scattering particles have been added or a microlens sheet where scattering particles have been added.

Although the optical sheet unit 30B consists of only one scattering particle optical sheet 40, due to the scattering particles added to the scattering particle optical sheet 40, it may present an equivalent level of screening ability as the optical sheet unit which consists of a plurality of common optical sheets. By appropriately selecting the density of the scattering particles added to the scattering particle optical sheet 40, it is possible to present a sufficient screening ability with only one optical sheet.

According to the liquid crystal display apparatus 3 of the third exemplary embodiment aforementioned, by selecting the optical sheet unit 30B which consist of only one scattering particle optical sheet 40, it is possible to significantly reduce the number of optical sheets than a common conventional optical sheet unit. Accordingly, it is possible to reduce the manufacturing cost of the liquid crystal display apparatus 3, as well.

Figure 11:
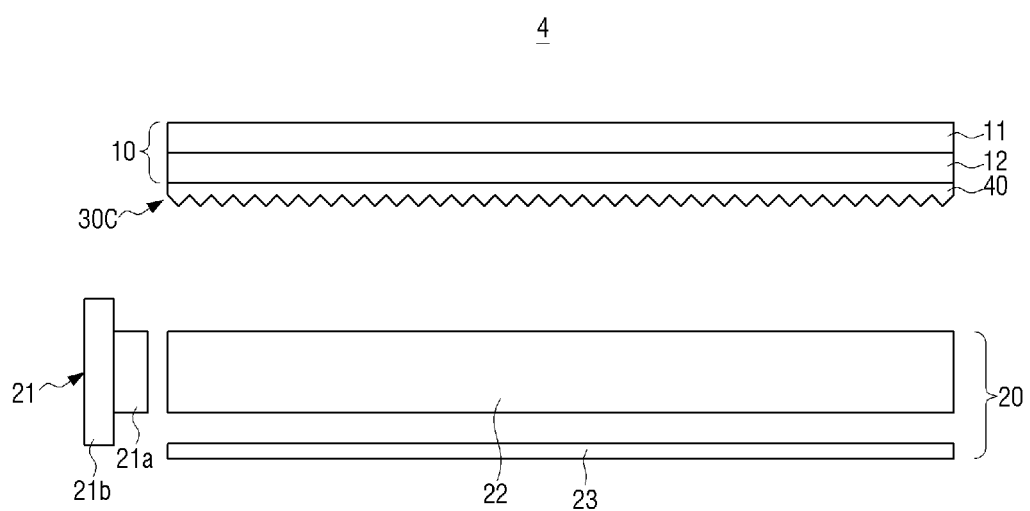
FIG. 11 is a diagram illustrating a liquid crystal display apparatus according to a fourth exemplary embodiment of the present inventive concept.

FIG. 11 is a diagram illustrating a liquid crystal display apparatus according to a fourth exemplary embodiment of the present inventive concept.

Referring to FIG. 11, the liquid crystal display apparatus 4 according to the fourth exemplary embodiment of the present disclosure includes a liquid crystal panel 10, backlight 20, and optical sheet unit 30C.

The liquid crystal panel 10 and backlight 20 illustrated in FIG. 11 are the same as the liquid crystal panel 10 and backlight 20 illustrated in FIG. 1, and thus repeated explanation thereof is omitted.

The optical sheet unit 30C consists of only one scattering particle optical sheet 40. For example, the scattering particle optical sheet 40 may be one of the prism sheets illustrated in FIGS. 2 to 4. For another example, the scattering particle optical sheet 40 may consist of a diffuser sheet where scattering particles have been added or may consist of a microlens sheet where scattering particles have been added.

Although the optical sheet unit 30C consists of only one scattering particle optical sheet 40, due to the scattering particles added to the scattering particle optical sheet 40, it is possible to present a screening ability equivalent to an optical sheet unit consisting of a plurality of common optical sheets. By appropriately selecting the density of the scattering particles added to the scattering particle optical sheet 40, it is possible to provide a sufficient screening ability with only one optical sheet.

As illustrated in FIG. 11, the scattering particle optical sheet 40 is attached to the liquid crystal panel 10 as a type of film. More specifically, the scattering particle optical sheet 40 is attached to a lower panel of the liquid crystal panel 10. In this regard, the scattering particle optical sheet 40 of FIG. 11 is different from the scattering particle optical sheet 40 of FIG. 10.

Figure 12:
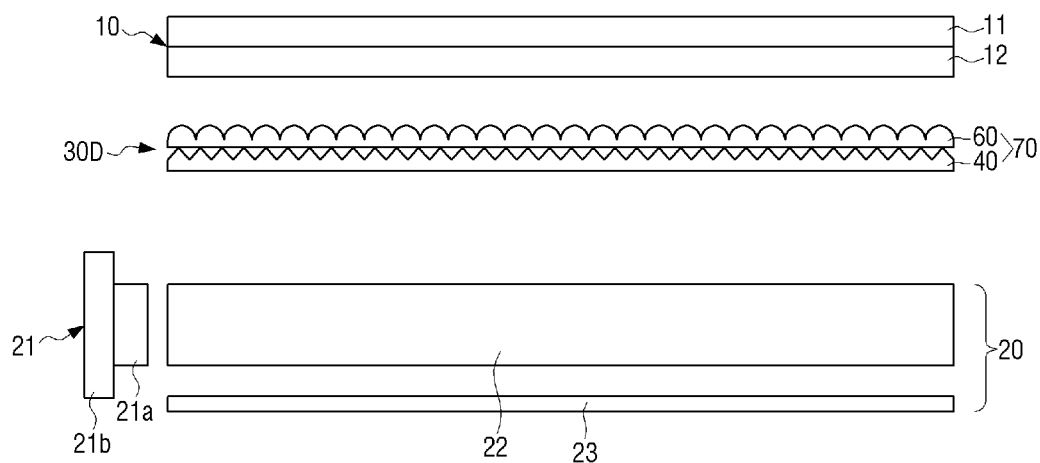
FIG. 12 is a diagram illustrating a liquid crystal display apparatus according to a fifth exemplary embodiment of the present inventive concept.
Figure 13:
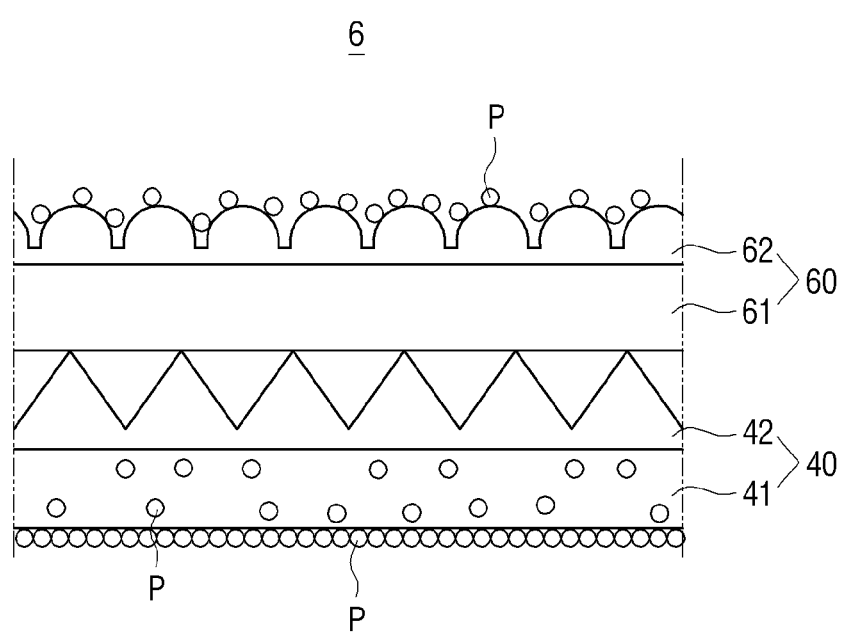
FIG. 13 is a diagram illustrating an enlarged view of a compound sheet provided in the liquid crystal display apparatus of FIG. 12.

FIG. 12 is a diagram illustrating a liquid crystal display apparatus according to a fifth exemplary embodiment of the present inventive concept, and FIG. 13 is a diagram illustrating an enlarged view of a compound sheet provided in the liquid crystal display apparatus of FIG. 12.

Referring to FIGS. 12 and 13, the liquid crystal display apparatus 5 according to the fifth exemplary embodiment of the present inventive concept includes a liquid crystal panel 10, a backlight 20, and an optical sheet unit 30D.

Herein, the liquid crystal panel 10 and backlight 20 are the same as the liquid crystal panel 10 and backlight 20 illustrated in FIG. 1, and thus explanation thereof is omitted.

The optical sheet unit 30D consists of one compound sheet 70, and the compound sheet 70 includes a first optical sheet 60 and second optical sheet 40 which are mutually bonded to each other. The first optical sheet 60 and second optical sheet 40 may be selected from among a various types of optical sheets, and in the present exemplary embodiment, the first optical sheet 60 and second optical sheet 40 are respectively a microlens sheet and prism sheet.

As illustrated in FIG. 13, the first optical sheet 60 includes a first base layer 61 and first optical functional layer 62, and a second optical sheet 40 includes a second base layer 41 and second optical functional layer 42.

In each of the first optical sheet 60 and second optical sheet 40, scattering particles are additionally provided. More specifically, scattering particles P are provided in an external surface of the first optical functional layer 62 and in a lower surface and inside of the second optical sheet 40. This is a mere example, and thus scattering particles P may be distributed in only one of the first optical sheet 60 and second optical sheet 40. Furthermore, the place where the scattering particles are to be provided in the optical sheets 60, 40 may be determined as one of the external surface and inside thereof.

The compound sheet 70 in this exemplary embodiment is also a kind of scattering particles sheet since scattering particles P are additionally provided. Therefore, the screening ability is reinforced compared to a common conventional compound sheet 70. Thus, the number of optical sheets of the optical sheet unit 30D which includes the compound sheet 70 may be reduced, and the manufacturing cost of the liquid display apparatus 5 may also be reduced.

Figure 14:
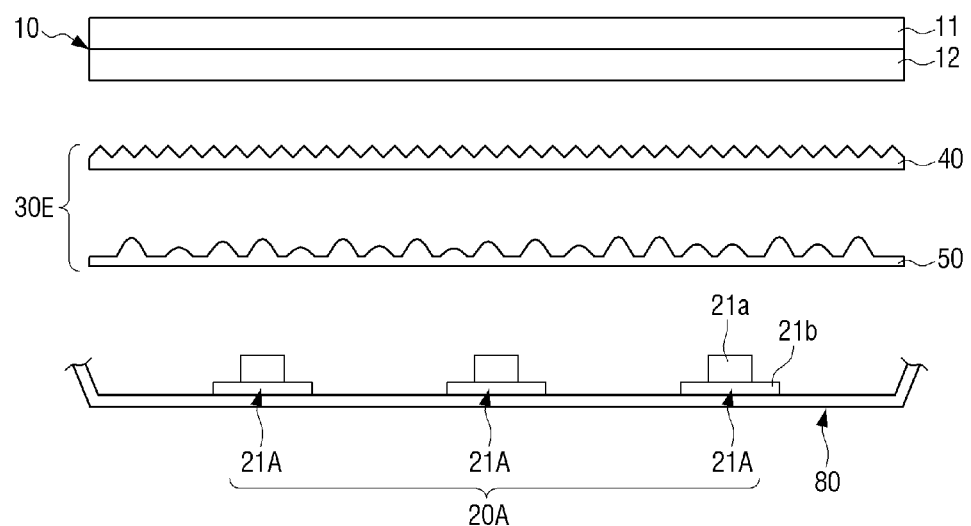
FIG. 14 is a diagram illustrating a liquid crystal display apparatus according to a sixth exemplary embodiment of the present inventive concept.
Figure 15:
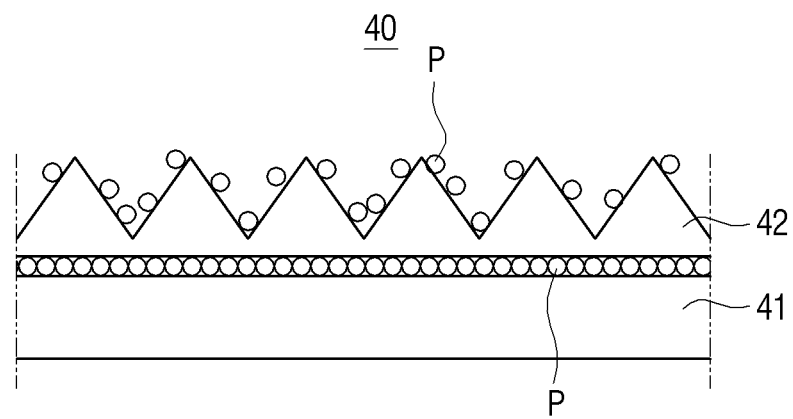
FIG. 15 is a diagram illustrating an enlarged view of a scattering particle optical sheet provided in the liquid crystal display apparatus of FIG. 14.

FIG. 14 is a diagram illustrating a liquid crystal display apparatus according to a sixth exemplary embodiment of the present inventive concept, and FIG. 15 is a diagram illustrating an enlarged view of a scattering particle optical sheet provided in the liquid crystal display apparatus of FIG. 14.

Referring to FIGS. 14 and 15, the liquid crystal display apparatus 6 according to the sixth exemplary embodiment of the present inventive concept includes a liquid crystal panel 10, backlight 20A, optical sheet unit 30E and back surface chassis 80.

Herein, the liquid crystal panel 10 is the same as the liquid crystal panel 10 illustrated in FIG. 1, and thus an explanation thereof is omitted.

The backlight 20A includes a plurality of light sources 21A, and in this exemplary embodiment, the backlight 20A has three light sources 21A. Each of the light sources 21A includes a plurality of lights 21a and a light source supporting board 21b that supports the plurality of lights 21a. Each of the light sources 21A is placed to face the liquid crystal panel 10. Therefore, the backlight 20A of this exemplary embodiment corresponds to a direct type backlight. These three light sources 21A are installed inside the back surface chassis 80 for packaging the liquid crystal panel 10 and backlight 20A.

The optical sheet unit 30E includes a prism sheet 40 and diffuser sheet 50. At least one of these prism sheet 40 and diffuser sheet 50A is a scattering particle optical sheet, as aforementioned.

For example, as illustrated in FIG. 15, the prism sheet 40 may be a scattering particle optical sheet where scattering particles P are provided in an external surface of the optical functional layer 42 and in a front surface of the base layer 41.

As such, forming a scattering particle optical sheet with at least one of the optical sheets forming the optical sheet unit may also be applied to a liquid crystal display apparatus where a direct type backlight is applied. In such a case, the advantage of reducing the manufacturing costs of the liquid crystal display apparatus as the number of sheets of the optical sheets forming the optical sheet unit is reduced also applies to other exemplary embodiments of a liquid crystal display apparatus which includes an edge type backlight.

As aforementioned, according to a liquid crystal display apparatus in the exemplary embodiments of the present inventive concept, as the optical sheet unit has at least one scattering particle optical sheet, the screening ability may be increased, and accordingly, the number of optical sheets may be reduced, compared to a common conventional sheet unit, thereby also reducing the manufacturing cost of the liquid crystal display apparatus.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid crystal display apparatus comprising:
a liquid crystal panel;
a backlight which provides light to the liquid crystal panel; and
an optical sheet unit placed between the liquid crystal panel and backlight;
wherein the optical sheet unit includes at least one kind of scattering particle optical sheet selected from a plurality of kinds of scattering particle optical sheets where scattering particles are provided, and
wherein the optical sheet unit includes a prism sheet and a diffuser sheet which respectively include scattering particles.

2. The apparatus according to claim 1, wherein the at least one kind of scattering particle optical sheet comprises:
an optical functional layer; and
a base layer which supports the optical functional layer,
wherein the scattering particles are provided in at least one of the optical functional layer and the base layer.

3. The apparatus according to claim 2, wherein the scattering particles are provided in the optical functional layer.

4. The apparatus according to claim 3, wherein the scattering particles are provided in an external surface and inside of the optical functional layer.

5. The apparatus according to claim 2, wherein the scattering particles are provided in an external surface or inside of the optical functional layer.

6. The apparatus according to claim 2, wherein the scattering particles are provided in the base layer.

7. The apparatus according to claim 6, wherein the scattering particles are provided in an external surface and inside of the base layer.

8. The apparatus according to claim 2, wherein the scattering particles are provided in an external surface or inside of the base layer.

9. The apparatus according to claim 1, wherein the at least one kind of scattering particle optical sheet is one of the diffuser sheet, the prism sheet, a microlens sheet, and a protection sheet.

10. The apparatus according to claim 1, wherein the at least one kind of scattering particle optical sheet comprises:
a first optical sheet; and
a second optical sheet bonded to the first optical sheet,
the first optical sheet comprises:
a first functional layer; and
a first base layer which supports the first optical functional layer, and
the second optical sheet comprises:
a second optical functional layer; and
a second base layer which supports the second optical functional layer.

11. The apparatus according to claim 10, wherein the scattering particles are provided in at least one of the first optical functional layer, the first base layer, the second optical functional layer, and the second base layer.

12. The apparatus according to claim 10, wherein the first optical sheet and the second optical sheet are different kinds of optical sheets.

13. The apparatus according to claim 1, wherein the scattering particle is formed by one of acryl, nylon, Barium sulfate (BaSO4), Aluminum (Al), and silver (Ag).

14. The apparatus according to claim 1, wherein the optical sheet unit comprises the scattering particle optical sheet as a unique optical sheet.

15. The apparatus according to claim 1, wherein the scattering particle optical sheet is attached to a back surface of the liquid crystal panel.

16. The apparatus according to claim 1, wherein the optical sheet unit includes no more than a single sheet of each type of scattering particle optical sheets.

17. The apparatus according to claim 1, wherein each of the scattering particles is nanometer-sized.

18. The apparatus according to claim 1, wherein the at least one kind of scattering particle optical sheet is attached to a lower panel of the liquid crystal panel.

19. A liquid crystal display apparatus comprising:
an optical sheet unit placed between a liquid crystal panel and a backlight;
the optical sheet unit includes at least one kind of scattering particle optical sheet selected from a plurality of kinds of scattering particle optical sheets where scattering particles are provided,
wherein the optical sheet unit includes a prism sheet and a diffuser sheet which respectively include scattering particles.

20. The liquid crystal display apparatus according to claim 19, wherein the at least one kind of scattering particle optical sheet comprises:
   an optical functional layer; and
   a base layer which supports the optical functional layer,
   wherein the scattering particles are provided in at least one of the optical functional layer and the base layer.

21. A liquid crystal display apparatus comprising:
   an optical sheet unit including at least one kind of scattering particle optical sheet selected from a plurality of kinds of scattering particle optical sheets where scattering particles are provided,
   wherein the optical sheet unit includes a prism sheet and a diffuser sheet which respectively include scattering particles.

22. The liquid crystal display apparatus of claim 21, wherein:
   the optical sheet unit is placed between a liquid crystal panel and a backlight.

23. The liquid crystal display apparatus of claim 21, wherein:
   the at least one kind of scattering particle optical sheet includes:
   an optical functional layer; and
   a base layer which supports the optical functional layer, and
   wherein the scattering particles are provided in at least one of the optical functional layer and the base layer.

* * * * *